Feb. 28, 1961 C. F. SCHLOSSTEIN 2,973,029
PASSENGER SAFETY EQUIPMENT FOR AUTOMOBILE
Filed June 16, 1958

INVENTOR.
CLIFFORD F. SCHLOSSTEIN
BY
Robinson & Berry
ATTORNEYS

United States Patent Office 2,973,029
Patented Feb. 28, 1961

2,973,029

PASSENGER SAFETY EQUIPMENT FOR AUTOMOBILE

Clifford F. Schlosstein, 2003 Smith Tower, Seattle, Wash.

Filed June 16, 1958, Ser. No. 742,230

2 Claims. (Cl. 155—173)

This invention relates to improvements in passenger carrying automobiles of the present day conventional types. More particularly, it has reference to what may be classed as passenger safety equipment.

As matter explanatory to the present invention, it will here be noted that if a person should be sitting in a normal relaxed position in an automobile that is standing still or in one that might be moving at relatively slow speed on a highway and should that automobile be struck in the rear by a vehicle traveling forwardly at a high rate of speed, the resultant impact may cause the head and neck of the relaxed person in the forward vehicle to be snapped back in hyperextension and then to rebound forwardly in flexion, resulting in a broken or dislocated neck or in severe neck injury. Such an injury is what, in the medical profession, is known as "whiplash." It has been determined that such an injury may be due as much to the rebound as to the hyperextension and that the extent of rebound is generally in accordance with the severity or extent of hyperextension.

In view of the above conclusions, and also in view of the fact that whiplash accidents are increasing in number quite radily with the advent of higher powered and faster traveling automobiles, it has been the primary object of this invention to provide novel means, as attachments to or as permanent parts of the seats in an automobile, whereby the seat occupants may be protected against detrimental injury as a result of "whiplash" as above defined.

It is a further object of the invention to provide means for the above stated purpose that is attached to the automobile seat or is so associated with the seat, at a location immediately back of a seat occupant's head, that it will serve first, in the event of a rear end crash, to restrain the occupant's head against extreme or injurious "snap-back" and in doing this will also so retard whatever whiplash movement there may be, that the rebound of the head which generally follows will be reduced to a non-injurious degree.

Still further objects of the invention reside in the details of construction and combination of parts embodied by the invention, particularly in respect to the novel means for cushioning the rider's head to retard and reduce the whiplash or snap-back action and thus give the rider's reflexes time to prevent or counteract rebound.

In accomplishing the above mentioned and other objects of the invention, I have provided the improved details of construction, the preferred forms of which are illustrated in the accompanying drawings, wherein.

Figure 1:
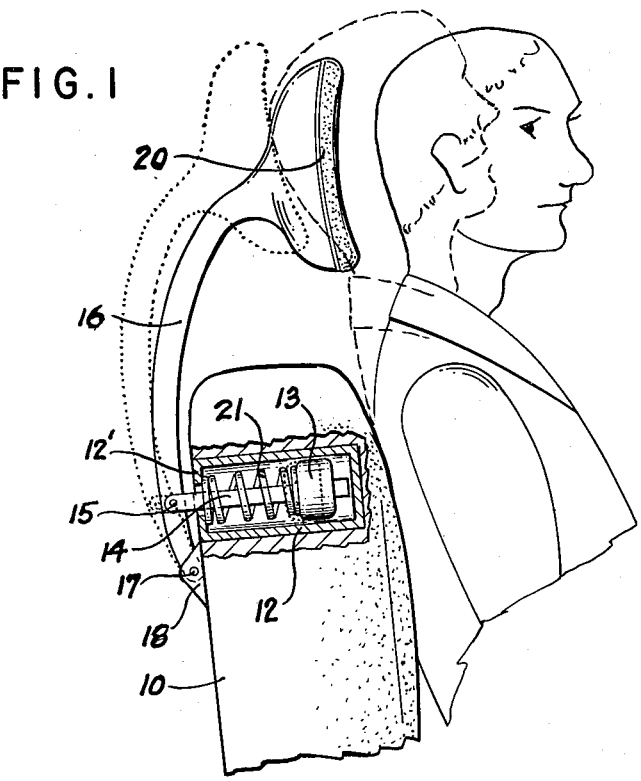
Fig. 1 is a view illustrating an apparatus, embodied by the present invention, as applied to a part of a seat in a passenger automobile for preventing whiplash injury to the rider occupying the seat; a part of the seat back and the air cylinder of the applied device being herein shown in section for better understanding of the invention.

Referring more in detail to the drawings:

10 designates what may be the top or upper portion of the back of a conventional form of automobile seat as used in a passenger carrying automobile. Fixedly mounted in the upper portion of this seat back 10 is a substantially horizontally disposed air cylinder 12 in which a piston 13 is loosely fitted for limited reciprocal movement. Extended from the piston is a piston rod 14. This projects from the rear end of the air cylinder and extends to the rear of the seat member where it is pivotally attached, as at 15, to an upwardly directed lever arm 16. Arm 16 is pivotally fixed at its lower end, as as 17, to a supporting bracket 18 that is fixed to the seat back. At its upper end, at about the level of the head of the seat occupant, the lever 16 is equipped with a forwardly facing head stop of cushion-like form, here designated by reference numeral 20.

The normal position of the piston 13 in the air cylinder 12 is that shown in Fig. 1. It is yieldingly retained in that position by a coiled spring 21 that is located in the cylinder about rod 14 and is retained under slight compression between the piston and rear end wall 12' of the cylinder. In the event that the automobile which is equipped with this device being struck in the rear by a fast-moving vehicle, the rider's head will be snapped back against the cushion 20. This snap-back action will be so retarded or lessened by the cushion and resistance to its rearward movement afforded by the coil spring 21 acting against the piston 13 that the reflexes of the rider will be given sufficient time to react thus to enable the rider to resist rebound to sufficient extent to avoid any severe injury.

It is further to be understood that by reason of use of the piston, there will be no rebound augmenting force resulting from the expanding of the coiled spring 21 immediately after the snap-back action of the head. This is by reason of the fact that the piston 13 in returning forwardly, traps air in the forward end of the cylinder and this serves to retard the return of the member 20 to normal setting.

The effectiveness of the present equipment as seen in Fig. 1, for its intended purposes is due not only to the provision of spring means for cushioning and retarding the snap-back or hyperextension of the rider's head but also in the provision of means for preventing any quick return of the member 20 that would augment the natural rebound action. When the snap-back action is retarded or delayed, even a fractional part of a second, this will give time for the reflexes of the rider to respond and automatically resist injurious rebound.

Figure 2:
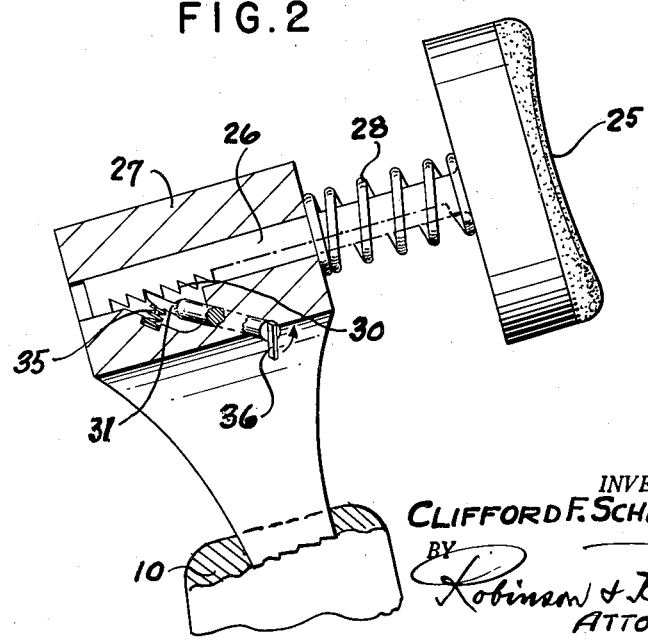
Fig. 2 is a sectional detail of the invention in an alternative form of construction.

In Fig. 2, I have shown an alternative form of device designed to serve the same purposes of the device of Fig. 1 in a corresponding manner. In this device, a head stop or cushion 25 is mounted by a rearwardly directed bar 26 that is slidably mounted for endwise movement in a support 27 that is designed to be fixed to the seat back 10. A coil spring 28 is disposed about the bar, under compression, between the back of the cushion and the forward end surface of the support to urge it toward the rack teeth. However, the pawl can be manually disengaged by means of an exposed handle member 36 at its mounting end when resetting of the head cushion is desired.

In the event of a rear end crash, the snap-back of the rider's head will be resisted by the spring 28. When the rearward travel of the bar stops, the locking pawl takes effect and thus whatever rebound there may be cannot be augmented by the force of spring 28.

Devices of the kinds disclosed are not used as head rests but merely to resist and retard snap-back of the seat occupant's head following a rear end collision, and then to be prevented the resisting force from augmenting the natural rebound.

It is recognized that various ways of resisting the snapback of the head might be effected and it is not the intent that the claims be limited to the specific devices herein shown but that they be given an interpolation that is commensurate with the objects given.

What I claim as new is:

1. A safety means for preventing "whiplash" injury to a person occupying a vehicle seat; said safety means comprising a head cushioning member, a support for holding said cushioning member in a normal position immediately back of the head of the person occupying the seat, means associated with said support for yieldingly resisting rearward movement of said cushioning member and support, and means for resisting the automatic return of the cushioning member and support to normal position after being moved rearwardly.

2. The combination recited in claim 1 wherein the support for said head cushioning member comprises a lever arm which mounts said head cushioning means at its upper end and which is pivotally fixed at its lower end to said seat, and wherein said means for yieldingly resisting the rearward movement of said cushioning member comprises a spring and the means for retarding return of the member to normal position under force of said spring comprises an air cylinder, a piston loosely fitted therein, and a rod connecting the arm and piston.

References Cited in the file of this patent

UNITED STATES PATENTS

| | | |
|---|---|---|
| 830,826 | DeFontes | Sept. 11, 1906 |
| 2,642,124 | Slowey | June 16, 1953 |
| 2,788,842 | Ohlenkamp | Apr. 16, 1957 |